May 25, 1943.          R. M. THOMAS ET AL          2,320,313
                          CABLE STRUCTURE
                        Filed Jan. 26, 1939
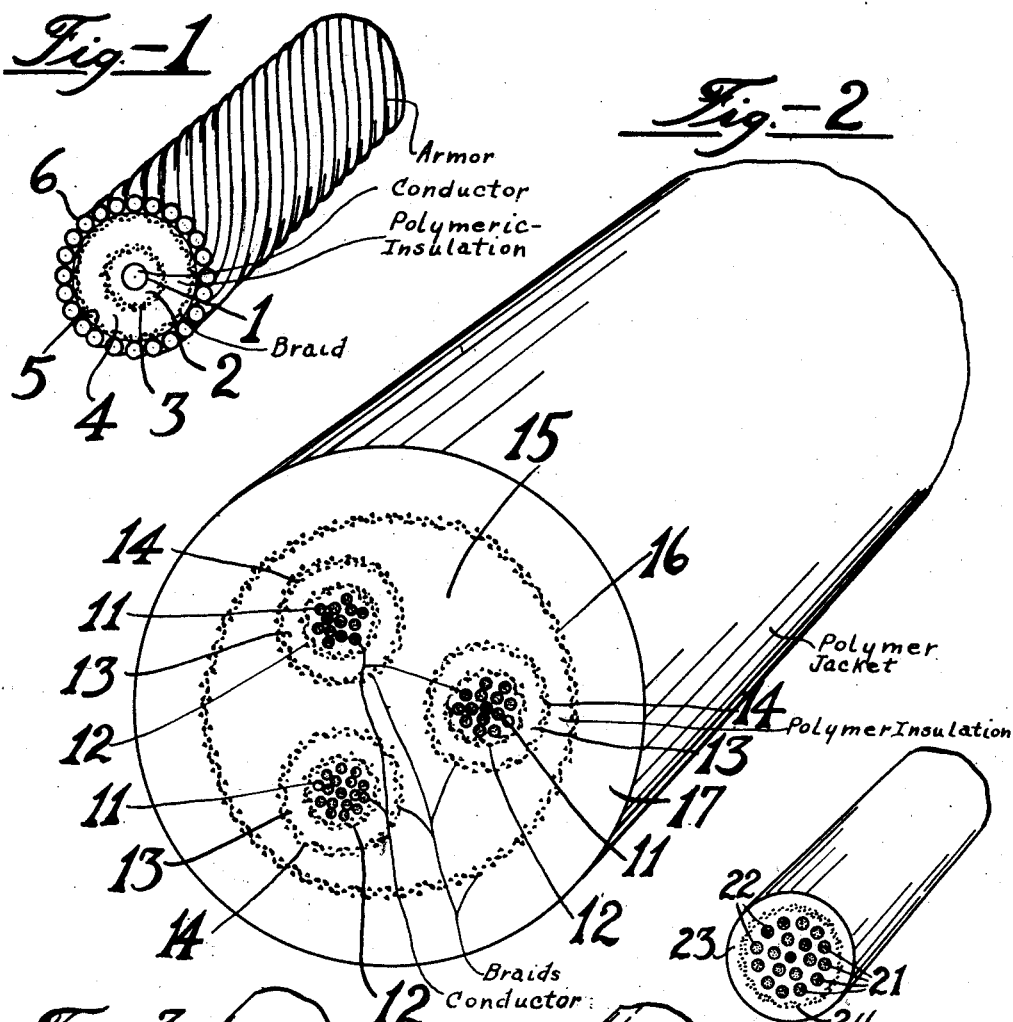
William J. Sparks,
Robert M. Thomas, Inventors
Irving E. Lightbown
By ... Young Attorney Patented May 25, 1943

2,320,313

UNITED STATES PATENT OFFICE 2,320,313

CABLE STRUCTURE

Robert M. Thomas, Union, Irving E. Lightbown, Elizabeth, and William J. Sparks, Cranford, N. J., assignors to Jasco, Incorporated, a corporation of Louisiana Application January 26, 1939, Serial No. 252,850

11 Claims. (Cl. 178—45)

This invention relates to electric cables, and particularly to a new and useful insulating material for the supporting and insulating member of an electric cable; and to an insulated conductor.

In the manufacture of electric cables, especially cables for relatively high voltages, great difficulty has been encountered in the production of a cable which is resistant to moisture, ionization and corona effects; which is physically strong; which has a low di-electric capacity, and a good resistance to electrical puncture. Prior cables have been constructed almost wholly of various rubber compositions in combination with fabric supporting members wrapped around and between the various conductors (which are usually either copper or aluminum) of the cable. However, rubber is definitely hydroscopic, and while dry rubber has a fairly high electrical resistance, di-electric strength, and a fair di-electric constant, rubber when exposed to moisture absorbs considerable quantities which act to cause a very serious reduction in the insulation resistance and an especially serious reduction in the di-electric strength, as well as a serious change in the di-electric constant. For submarine cable communication service, rubber and the rubbery materials such as caoutchouc and gutta-percha are usable, in spite of the relatively low insulation resistance, and di-electric constant. Since communication service voltages are low, the reduction in di-electric strength of the insulation is a relatively minor matter but the poor di-electric constant and the resulting tremendously high electrostatic capacity of the cable very greatly slow down the rate of cable communications since for every current pulse of the code, the entire electrostatic capacity of the cable must be saturated before the pulse is effective at the remote end of the cable.

For high voltage transmission cables, the reduction in the electrical characteristics of rubber by the presence of moisture is even more serious, especially the reduction in di-electric strength, since this reduction in strength necessitates very much thicker insulation than would be necessary with materials which held their original di-electric strength. For short lengths of cables such as under-water crossings of a few feet to a limited number of miles, the electrostatic capacity of the cable is a relatively unimportant factor but for long cables of several miles or more, the di-electric constant of the insulation also is exceedingly important, since a high di-electric constant results in a large distributed capacity in the cable, and seriously harms the voltage regulation of the power system into which the cable is connected. Similarly, the relatively low di-electric resistance and poor power factor of moist rubber also results in harmful loss of current, and undue heating.

Accordingly it has been necessary in the prior art of the construction of cables, especially high voltage cables, to enclose them in a lead sheath to protect the rubber insulation, thereby very greatly increasing the bulk, weight and cost of the cable. Furthermore, the ordinary rubber compounds suitable for service in cables are of relatively low abrasion resistance and relatively low resistance to flexure; and accordingly cables for service which involves considerable handling or dragging over the ground such as temporary power cables, or which involves continuous flexure, as in the case of elevator cables, great difficulty has been experienced in the use of rubber. Another troublesome difficulty in the use of rubber is found in the fact that copper is very harmful to rubber, and if a rubber coating is added directly to a copper wire, the rubber rapidly becomes brittle and has its rubbery character destroyed. This fact requires that rubber-insulated copper wires be "tinned" before the rubber insulating layer is applied. This is an extra operation which is expensive and highly undesirable.

The present invention provides a new material suitable for cable insulation. It is found that certain of the olefinic and diolefinic gases can be polymerized together at very low temperatures into a solid polymeric material of high strength, flexibility, elasticity, toughness, and of high resistance to abrasion and flexure. This material when combined with metallic conductors produces an electric cable having outstandingly valuable properties in the way of resistance to water, abrasion and flexure; and having high di-electric strength, high di-electric resistance and low di-electric constant, characteristics which are maintained in the presence of water, acid, alkali, pressure and high temperature in a way which is wholly lacking in the case of rubber.

Furthermore, the olefinic polymer is wholly unaffected by copper and there is no poisoning action of copper upon the polymer, and no harm is done to the desirable properties of the polymer by the presence of copper, hence copper wire which is insulated with the polymer material does not require the coating of tin, thereby permitting a very substantial saving in cost and the avoidance of the troublesome operation of "tinning" the copper conductor.

Furthermore, the polymer when properly treated, especially by the incorporation of small portions of sulfur into the material, retains its elasticity at any ordinary ambient temperature, and is non-flowing at the highest tropic temperatures and non-cracking at the lowest arctic temperatures even though the wire is sharply bent.

Thus an object of the invention is to insulate electric conductors with an iso-olefin polymer which has a high di-electric strength, high di-electric resistance, low di-electric constant and the capability of maintaining these characteristics in the presence of water, acid and alkali, and in addition high resistance to abrasion and flexure.

Other objects and structural details of the invention will be apparent from the following description when read in connection with the accompanying drawing wherein Fig. 1 is a view in perspective of a fragment of a submarine cable for telegraphic communication service constructed according to the invention;

Fig. 2 is a perspective view of a fragment of cable constructed according to the invention for polyphase high voltage service;

Fig. 3 is a perspective view of a fragment of cable according to the invention suitable for low power service such as gathering locomotives in mines and similar power service;

Fig. 4 is a perspective view of a fragment of elevator control and power cable according to the invention; and Fig. 5 is a perspective view of a fragment of telephonic communication cable according to the invention.

Referring to the drawing, the insulating material of the respective cables is produced by a polymerization reaction applied to unsaturated gaseous hydrocarbons. The raw material for the reaction is conveniently obtained from the waste gases resulting from the cracking operation which is now extensively applied to heavy petroleum oils for the production of gasoline. This cracking reaction produces a considerable proportion of gasoline boiling range hydrocarbons, and about 15% of gaseous material as well as a certain amount of residue. The gaseous material consists of hydrogen, low weight members of the methane series, low weight members of the ethylene series, isobutylene, the various butadienes, etc. These products are desirably fractionated and treated to separate from the mixture substantially pure isobutylene and substantially pure butadiene.

The isobutylene and butadiene are mixed in the proportion of approximately 70 to 90 parts of isobutylene, and 30 to 10 parts of butadiene, and the mixture is cooled to temperatures ranging from −10° to −125° C. at which lower temperatures it is a liquid under atmospheric pressure. The cooled mixed olefins are then treated with a catalyst, which may preferably be aluminum chloride dissolved in such solvents as ethyl chloride, or methyl chloride, or may be titanium chloride in the dissolved form, or may be various other similar metal halides. The reaction may conveniently be conducted in the presence of liquefied ethylene which serves as a solvent-diluent-refrigerant, and the polymerization continues to produce a polymer substance which is a nearly saturated, branched linear chain hydrocarbon of very high molecular weight, the molecular weight ranging from 50,000 to 300,000 or more.

The material may then be warmed to room temperature, and the various solvents, diluents and refrigerants evaporated off. Alternatively, the material may be precipitated from the solvent at a conveniently low temperature by the addition of alcohol or ketonic solvents. This precipitation procedure has certain advantages, in that it avoids the necessity of subsequently removing a solid catalyst (if such is used) from the finished polymer substance.

The resulting polymer substance when warmed up to room temperature is a solid, having a high degree of elasticity and elongation, and a small but sufficient thermal plasticity. It has a certain amount of chemical unsaturation present in the molecule; an amount greater than the unsaturation of the corresponding polymer of isobutylene alone. The polymer combines readily with such substances as chlorine, bromine, the various sulfur chlorides and even elemental sulfur. Its reactivity with oxygen and hydrogen is very low, and it is very resistant to acid and alkali, and to ozone, and electrical ionization.

In further sharp contrast to rubber, the polymer has a high degree of homogeneity. Rubber contains substantial portions of protein material and resin, in addition to the rubber substance itself, and these resins and protein materials are exceedingly harmful to the electrical characteristics of the rubber when used as insulating material. The protein substances appear to absorb water and provide conducting paths through the rubber. The resinous material seems to have a seriously harmful effect upon the di-electric constant of the rubber. The polymer material is a single pure substance free from resins and free from protein material, and in addition it is chemically nearly saturated, and accordingly does not participate in the reactions with oxygen which are characteristic of rubber. The polymer shows a small range of molecular weight in the various molecules, but this small range of molecular weight is negligible in its effect upon the physical and electrical characteristics of the polymer.

The outstanding characteristic of this insulating material is the fact that it can be chemically combined with and saturated with sulfur without destroying its elasticity and elongation, and greatly increasing the tensile strength and reducing the permanent set, thereby producing a material of maximum chemical passivity and maximum strength and durability and optimum electrical characteristics. This characteristic is in sharp and outstanding contrast to rubber, which cannot be chemically saturated by sulfur without losing all of its useful characteristics as a cable insulation. That is, rubber when chemically saturated with sulfur becomes hard rubber, which is merely a hard, brittle, inelastic resin without plasticity or elongation.

The sulfurization procedure as applied to the polymer consists in the incorporation into the polymer of approximately 5% of sulfur and the treatment of the compounded polymer at an elevated temperature to promote a combination between the polymer and the sulfur. The exact nature of this combination is still unknown. It does not appear to be a vulcanization reaction of the sort which is characteristic of rubber, since it is agreed that vulcanization in sulfur is a function of the amount of chemical unsaturation in the rubber substance, a part only of which is combined with sulfur to produce a rubber body of maximum elasticity and maximum tensile strength. In contrast to rubber, which has an iodine number of approximately 350, according to the purity of the rubber, and in contrast to isobutylene alone which has an iodine number of approximately 450, the polymer material has an iodine number usually between 5 and 10, indicating a very small amount of chemical unsaturation in the molecule. This amount of unsaturation in the polymer would be completely saturated by a small fraction of 1% of sulfur; but such an amount of sulfur has no perceptible effect upon the tensile strength or elasticity of the polymer, and from 2% to 5% or 6% of sulfur must be added to the polymer to develop the maximum elasticity; to develop the elastic limit; and to develop the optimum tensile strength. This amount of sulfur is, however, far more than enough to saturate all of the unsaturation in the polymer, and no clue is available as to the character of combination occurring.

This sulfurization procedure is facilitated by heating the rubber to a temperature of approximately 260° F. (125° C.) for a substantial period of time such as one to four hours. The speed of sulfurization is also aided by the inclusion of carbon disulfide derivatives of various types and by a proper choice of these compounds as indicated in the compounding formula, a substantial reduction in time of reaction is attainable.

In preparing the polymeric material for use in cable structures, it is desirably compounded with a variety of fillers, including elemental sulfur. A suitable composition is as follows:

| | Parts |
|---|---|
| 20% butadiene }polymer 80% isobutylene | 100 |
| Whiting | 15 |
| Zinc oxide | 5 |
| Stearic acid | 5 |
| Sulfur | 5 |
| Sulfurizing catalyst | 4 |

The above compounding formula utilizes whiting and zinc oxide as desirable pigments and fillers. The whiting may be replaced in part by carbon black, especially for the high strength outer jackets of the insulation, and it is found that up to about ten parts of carbon black per one hundred parts of polymer material may be added without injury to the electrical characteristics of the material. For maximum strength and flexure resistance of the polymer, substantially larger quantities of carbon black, up to one hundred fifty parts of carbon black per one hundred of polymer, may be used, but if such proportions of carbon black are used, it is preferably confined to an outer jacket which is not in contact with the conductor, and serves for a strengthening coating rather than for insulation.

This mixture may be compounded by working the various fillers into the material, preferably in a Werner and Pfleiderer type of mixer although the Banbury type of mixer or the double roll mixer may be used as desired. These latter are, however, less satisfactory, since they tend to produce an undesirable depolymerization of the polymer.

It is desirable that the sulfur shall combine chemically with the copolymer, to convert it into a fully chemically saturated compound. For test purposes the compounded material may be rolled out into a strip, and heated under pressure for two hours at a temperature of 120°–140° C. When so treated, the material, on test in a De Mattia type flexometer, showed no failure after 5,500,000 flexures whereas the best prior rubber composition for cable insulation failed after 600,000 flexures. The same copolymer material compounded for external sheath with carbon black when tested on a duPont abrader showed only 219 cc. loss of sample per horse power hour whereas the best prior rubber composition showed a loss of 286 cc. of sample per horse power hour. (The higher loss shows a poorer abrasion resistance.)

In preparing the cable structure, the compounded material before heating may be prepared in strip form suitable for wrapping around the conductor, or may be prepared for extruding upon the conductor.

In preparing the embodiment of Fig. 1, the conductor member 1 may conveniently be a solid copper or aluminum wire. As before pointed out, a copper conductor does not need to be tinned for use with the polymer material. A jacket of the compounded polymer material 2 may be added to the conductor 1 either by wrapping strips of the material in a spiral fashion around the wire, or by extruding the material onto the wire at an elevated temperature at which the compounded copolymer is sufficiently thermoplastic. The jacket of insulating material may be applied in several layers if desired with a fabric braiding 3 interposed between a polymer compound layer 2, and a second polymer compound layer 4. A second braiding 5 may be applied over the second polymer layer 4 if desired, and a wrapping of strengthening wires 6 may be applied either directly over the polymer layer 4, or over the braiding 5. If the braiding 5 is used, it is usually desirable to protect the braiding by still another layer of polymer compound. The wires 6 may conveniently be of stainless steel, in which case they may be left as the final outer layer, or if ordinary steel wires are used for the wires 6, a still further layer of polymer compound may be applied over the wires 6. The entire cable is then heated to a temperature between approximately 150° C. and 160° C. for approximately two hours, to complete the reaction between the sulfur and the polymer. Such a cable shows a low electrostatic capacity when dry, and the electrostatic capacity does not rise to any substantial extent even after prolonged soaking in water.

In preparing the embodiment of Fig. 2, which is a cable suitable for a high tension power transmission, both the di-electric resistance, the di-electric strength and the di-electric constant are of importance. In comparison to rubber of good grade, the polymer material has the following characteristics:

| Sample | Di-electric constant | Power factor (40° C.) |
|---|---|---|
| | | Per cent |
| Rubber (dry) | 2.46 | 0.04 |
| Polymer material (dry) | 2.11 | 0.04 |
| Rubber (after 48 hrs. in H₂O) | 2.76 | 0.16 |
| Polymer material (after 48 hrs. in H₂O) | 2.01 | 0.05 |

It will be observed from this table that even a good grade of rubber shows a very substantial increase in di-electric constant after soaking in water, whereas the polymer material shows a reduction. Similarly, the rubber shows a very sharp increase in di-electric loss, as measured by the power factor, after submergence in water, whereas the polymer material shows a very slight increase which is within the experimental error of the determinations.

The electrical conductivity of rubber varies between about 20 and $100 \times 10^{-17}$ mho per cm.$^3$, wheras the polymer material (when sulfurized) shows a conductivity of approximately $1 \times 10^{-17}$ mho per cm.$^3$.

Similarly the breakdown voltage of the polymer is found to be substantially in excess of that for rubber.

Thus the low di-electric constant, especially when the material is wet, permits of relatively thinner layers of insulating material for a given cable capacitance, and since the breakdown voltage is also higher, the thinner insulation layer does not reduce the di-electric strength of the cable.

Accordingly the embodiment of Fig. 2 may be prepared by twisting together the respective conductor strands 11 which are desirably covered with braiding 12 to hold them in a tight spiral. A layer of polymer material 13 is applied to the respective strands either by extruding the material around the conductors at an elevated temperature, or by wrapping strips of the polymer material around the conductor. The layer of polymer insulating material is then desirably covered with a second braiding 14, and a second layer of polymer 15 is applied surrounding all three of the conductors 12. The conductors may be covered with the second layer of polymer 15 as a parallel laid cable, or as a spiral laid cable, according to the user's desires. For intermediate voltage service, the cable may be used in this form, either for submarine service or for aerial or buried service and it is found to have a satisfactorily high resistance to the hazards of service, especially at intermediate and high voltages. If still higher resistance to the hazards of service is desired, a third braiding 16 may be applied over the second layer of polymer 15, and a final layer of polymer substance 17 may be applied over the braiding 16.

This cable construction is particularly advantageous for high voltage service, since it gives substantially all of the characteristics of the oil-filled cable which has previously been necessary for ultra-high voltage service. It will be observed that the polymer substance is substantially a saturated, long linear chain hydrocarbon, and homogenous throughout, and accordingly there are no voids or physical or chemical discontinuities in the body of the insulation at which concentrations of the di-electric field can occur and accordingly no voltage field concentrations appear within the body of the di-electric of sufficiently high voltage gradient to produce ionization within the body of the di-electric resistance. Accordingly the powerful chemical effect of ionization does not occur within the body of the insulation. Furthermore, the polymer material is much more resistant to chemical reactions of any sort, including ionization, and therefore reinforcing braiding may be used with much less danger of breakdown than is the case with any other insulation, since even though the presence of a small amount of braiding does provide physical discontinuities any ionization which may occur at the braiding is substantially without effect upon the polymer insulation. Furthermore, the toughness of the copolymer material permits it to be used in direct contact with the environment and avoids the necessity of a metallic protective covering such as a lead sheath. Accordingly the problem of differences in co-efficient of expansion between a metallic sheath and the insulating material does not arise. That is, no voids appear within the insulating material at low temperatures, and no pressure is developed upon the insulating material at high temperatures, since it is free to contract and expand without the limitations imposed by the rigid jacket. For this further reason, that is the absence of voids, ionization effects are still more effectively avoided within the insulating body around the conductors of the cable.

The embodiment of Fig. 3 is particularly advantageous, since by the use of the polymer substance 18 around conductor 19 it is possible to produce a two-conductor or three-conductor cable suitable for service at voltages ranging from 220 to 650 with either direct current or alternating current for service to portable equipment, such as gathering locomotives in mines, electrically driven power shovels, electrically driven farm equipment and similar service on electrically driven portable tools of all descriptions. The high di-electric resistance and high di-electric strength of the polymer permit the use of relatively thin layers of copolymer material for insulation around the conductors, and the extremely high abrasion resistance and flexure strength permit the use of a cable with a projecting jacket of the polymer substance under conditions of almost any severity of duty.

This is especially true in elevator service for which the embodiment of Fig. 4 is particularly desirable. In a cable containing conductors of fine copper strand such as No. 30 B. & S. gauge or smaller, the copper conductors will outlast the insulation when the conductors are insulated with rubber and braid. The cable of Fig. 4 may be constructed of stranded wires 21, preferably without braiding. The wire conductors 21 are covered with an insulating layer of polymer 22, the several covered conductors cabled, either parallel laid or spiral laid, and a jacket of polymer 23 is applied over the cabled conductors. This is a cable suitable for elevator service, readily constructed to provide any desired number of circuit leads and containing nothing but metallic conductor and polymer insulation. Alternatively braidings 24 may be included within the body of the cable. Such braidings withstand a far less number of flexures than the polymer insulation will withstand, and accordingly the braidings which are usually of cotton may disintegrate before the polymer insulation begins to wear. This, however, is wholly immaterial, since the breakdown product of the braidings is kept in place by the elasticity of the polymer insulation.

It is to be observed further, that the polymer being a saturated hydrocarbon has a substantial residual lubricating power, and accordingly the presence of polymer between the conductors produces a substantial and worthwhile lubricating effect, which still further lengthens the life of the metallic conductor strands.

The polymer material is, because of its low di-electric constant, particularly advantageous for communication cables such as submarine telephone cables. A suitable embodiment of this construction is shown in Fig. 5.

In this embodiment the circuit conductors 25 may if desired be of solid wire as shown, or may be stranded conductors. They may if desired be covered with a braiding 26 as indicated, but preferably they are covered directly by a layer 27 of the above described polymer material. They are preferably made up as a twisted pair, with a cylindrical layer of polymer 28 over them which may if desired be covered with a braiding 29. However, the braiding is not necessary, and is preferably omitted. Upon this portion of the cable there is then applied a spiral layer 31 of Permalloy tape as shown. A final layer of polymer material 32 is then applied over the Permalloy wrapping tape. The Permalloy serves to increase the inductive impedance of the cable to balance the interconductor capacitance and thereby minimize the attenuation of vibratory currents in the cable in the manner well known in the art. It is to be noted, however, that because of the relatively low di-electric constant of the polymer material, the interconductor capacitance is markedly lower, and accordingly a considerably smaller amount of Permalloy in the wrapping ribbon is sufficient to produce the desired reduction in attenuation.

The embodiment of Fig. 2 is shown as a polymer-covered cable. This cable as presented is suitable for laying underground, either in ducts, or in direct contact with earth, either wet or dry. It is similarly usable for submergence in water either fresh or salt, and when so submerged, it retains both its di-electric strength, its di-electric resistance and its good di-electric constant resulting in the desired high breakdown strength, the desired low interconductor capacity and the desired low loss in the insulation. Alternatively it may be used for aerial cable, under which service conditions it is resistant to rain, snow and ice, and because of its relatively small size and elastic surface, it is subject to a minimum of damage from ice, snow and sleet.

The embodiment of Fig. 2 is shown as complete without a protective sheath, and the outer layer of polymer material is substantially equal in strength, durability and protective effect to the usual type of lead sheath. If, however, for any reason it is desired to incorporate a protective sheath over the polymer, for such service, for instance, as in navigable waters where anchors may strike the cable, a covering of lead sheath, or a wrapping of steel wire, the latter of the type indicated in Fig. 1, may be applied to the cable. For most service, however, this is neither necessary nor desirable.

In the cable of Fig. 1, the low di-electric characteristic of the polymer material results in a much lower cable capacity, and thereby requires a lower charging current and a shorter charging interval, thereby markedly speeding up the rate at which code can be sent over it. Furthermore the much higher insulation resistance results in a reduction of current loss along the length of the cable, and in consequence a much larger proportion of the original current delivered to the cable appears at the remote end.

Similarly with the small power cable, the very high abrasion resistance toughness, and flexure resistance of the polymer material results in a cable which will withstand service which is impossible to obtain from the ordinary cable, and it thereby becomes possible to treat as portable equipment devices which otherwise must be regarded as permanently fixed equipment. For instance, step-down transformer sub-stations are regarded as necessarily permanent fixtures which must be connected with the power supply by a well-insulated pole line. The cable of the present invention has sufficient electrical and mechanical strength to permit the use of the cable for connection to portable transformer sub-stations at the lower transmission voltages. This is a result unobtainable with any previous type of cable construction.

The device of the invention thus provides a new type of cable, and a new type of cable insulation, by which a variety of previously unobtainable functions can be performed.

While there are above described but a limited number of embodiments of the device of the invention, it is possible to produce still other embodiments without departing from the inventive concept herein disclosed and it is therefore desired that only such limitations be imposed upon the appended claims as are stated therein or required by the prior art.

The invention claimed is:

1. A cable structure comprising in combination a conductor and an insulating material, comprising a high molecular weight interpolymer of isobutylene and a diolefin produced at temperatures ranging between $-10°$ C. and $-125°$ C. by the application of aluminum chloride dissolved in an alkyl halide having less than three carbon atoms, the said insulating polymer being characterized by plasticity, high tensile strength, high elongation, high chemical inertness, reactivity with sulfur, a high electrical break-down resistance and a low di-electric constant.

2. A cable structure comprising in combination a conductor and an insulating material, comprising a high molecular weight interpolymer of isobutylene and butadiene produced at temperatures ranging between $-10°$ C. and $-125°$ C. by the application of aluminum chloride dissolved in ethyl chloride, the said insulating polymer being characterized by elasticity, high tensile strength, high elongation, high chemical inertness, reactivity with sulfur, a high electrical break-down resistance and a low di-electric constant.

3. A cable structure comprising in combination a conductor and an insulating material, comprising a high molecular weight interpolymer of isobutylene and a diolefin produced at temperatures ranging between $-10°$ C. and $-125°$ C. by the application of aluminum chloride dissolved in an alkyl halide having less than three carbon atoms, the said insulating polymer being characterized by elasticity, high tensile strength, high elongation, high chemical inertness, reactivity with sulfur, a high electrical break-down resistance and a low di-electric constant, and sulfur chemically combined with and chemically saturating said polymer.

4. A cable structure comprising in combination a conductor and an insulating material, comprising a high molecular weight interpolymer of isobutylene and butadiene produced at temperatures ranging between $-10°$ C. and $-125°$ C. by the application of aluminum chloride dissolved in an alkyl halide having less than three carbon atoms, the said insulating polymer being characterized by elasticity, high tensile strength, high elongation, high chemical inertness, reactivity with sulfur, a high electrical break-down resistance and a low di-electric constant and compounding substances incorporated in said polymer comprising sulfur and a filler.

5. A cable structure comprising in combination a conductor and an insulating material, comprising a high molecular weight interpolymer of isobutylene and butadiene produced at temperatures ranging between −10° C. and −125° C. by the application of aluminum chloride dissolved in an alkyl halide having less than three carbon atoms, the said insulating polymer being characterized by elasticity, high tensile strength, high elongation, high chemical inertness, reactivity with sulfur, a high electrical break-down resistance and a low di-electric constant and compounding substances incorporated in said polymer comprising sulfur and a filler, together with a sulfurizing aid comprising a polysulfide organic sulfur compound.

6. A cable structure comprising in combination a conductor and an insulating material, comprising a high molecular weight interpolymer of isobutylene and butadiene produced at temperatures ranging between −10° C. and −125° C. by the application of aluminum chloride dissolved in an alkyl halide having less than three carbon atoms, the said insulating polymer being characterized by elasticity, high tensile strength, high elongation, high chemical inertness, reactivity with sulfur, a high electrical break-down resistance and a low di-electric constant, the said polymer being non-reactive with the metal of the conductor and applied directly thereto.

7. A cable structure comprising in combination a strand of conductive metal filaments and an insulating material, comprising a high molecular weight interpolymer of isobutylene and a diolefin produced at temperatures ranging between −10° C. and −125° C. by the application of aluminum chloride dissolved in methyl chloride, the said insulating polymer being characterized by elasticity, high tensile strength, high elongation, high chemical inertness, reactivity with sulfur, a high electrical break-down resistance and a low di-electric constant.

8. A cable structure comprising in combination a conductor and an insulating material, comprising a high molecular weight interpolymer of isobutylene and butadiene produced at temperatures ranging between −10° C. and −125° C. by the application of aluminum chloride dissolved in an alkyl halide having less than three carbon atoms, the said insulating polymer being characterized by elasticity, high tensile strength, high elongation, high chemical inertness, reactivity with sulfur, a high electrical break-down resistance and a low di-electric constant and a fibrous braid covering cooperating with said insulating polymer.

9. A cable structure comprising in combination a conductor and an insulating material, comprising a high molecular weight interpolymer of isobutylene and butadiene produced at temperatures ranging between −10° C. and −125° C. by the application of aluminum chloride dissolved in an alkyl halide having less than three carbon atoms, the said insulating polymer being characterized by elasticity, high tensile strength, high elongation, high chemical inertness, reactivity with sulfur, a high electrical break-down resistance and a low di-electric constant, the said polymer being subdivided into a plurality of insulating layers.

10. A cable structure comprising in combination a conductor and an insulating material, comprising a high molecular weight interpolymer of isobutylene and butadiene produced at temperatures ranging between −10° C. and −125° C. by the application of aluminum chloride dissolved in an alkyl halide having less than three carbon atoms, the said insulating polymer being characterized by elasticity, high tensile strength, high elongation, high chemical inertness, reactivity with sulfur, a high electrical break-down resistance and a low di-electric constant, the said polymer being subdivided into a plurality of insulating layers; and a layer of fibrous braid material between said layers.

11. A cable structure comprising in combination a conductor and an insulating material, comprising a high molecular weight interpolymer of isobutylene and butadiene produced at temperatures ranging between −10° C. and −125° C. by the application of aluminum chloride dissolved in an alkyl halide having less than three carbon atoms, the said insulating polymer being characterized by elasticity, high tensile strength, high elongation, high chemical inertness, reactivity with sulfur, a high electrical break-down resistance and a low di-electric constant, the said polymer being subdivided into a plurality of insulating layers and a layer of magnetic material cooperating with said conductor and said insulating material between said layers.

ROBERT M. THOMAS.
IRVING E. LIGHTBOWN.
WILLIAM J. SPARKS.